United States Patent Office

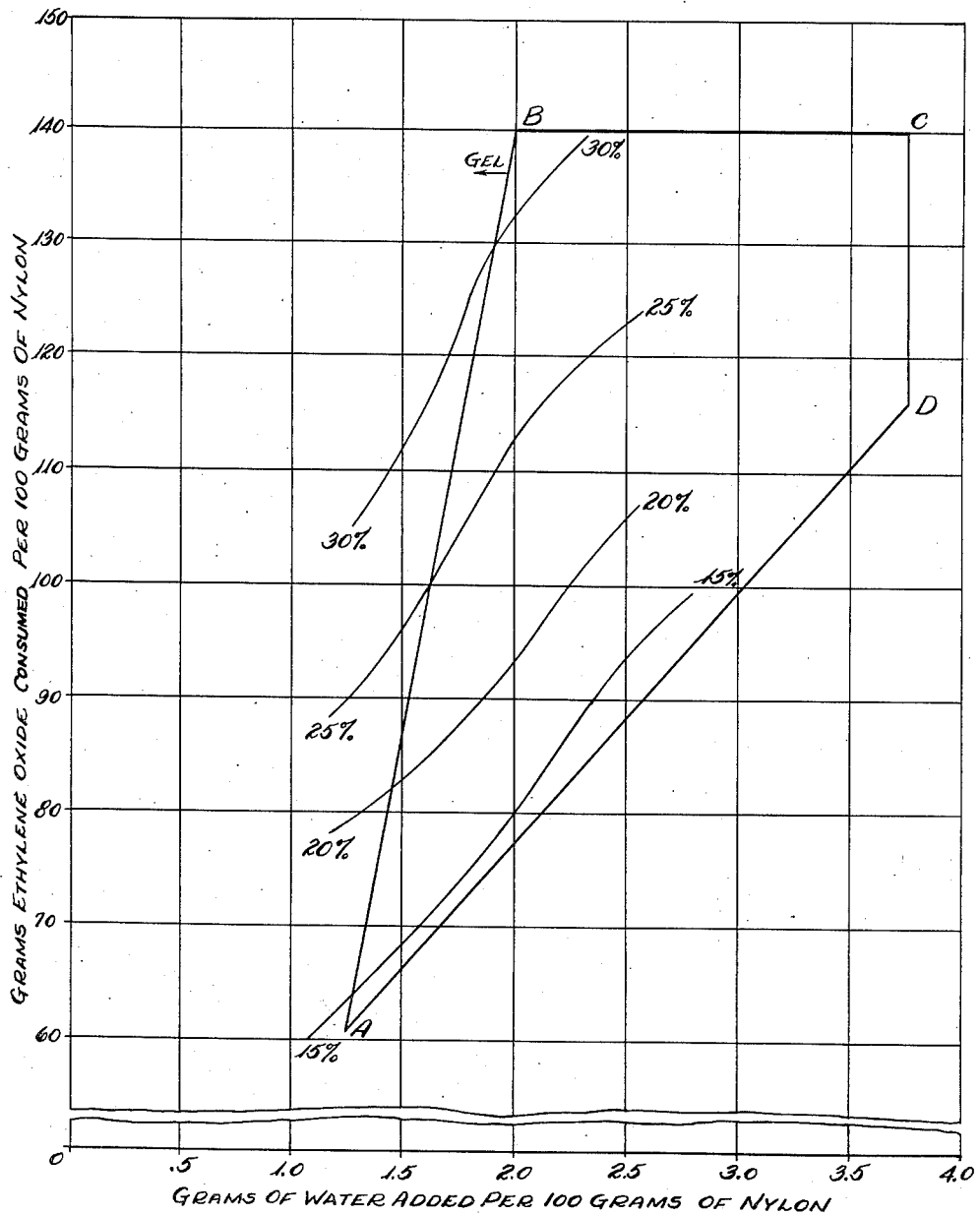

3,038,885
Patented June 12, 1962

3,038,885
PREPARATION OF NYLON DERIVATIVES
Chris E. Best, Franklin Township, Summit County, Ohio, assignor to The Firestone Tire & Rubber Company, Akron, Ohio, a corporation of Ohio
Filed Nov. 12, 1958, Ser. No. 773,301
9 Claims. (Cl. 260—78)

This invention relates to the preparation of reaction products of alcohol-soluble nylon resins with ethylene oxide, whereby the solution properties of the nylon resins are greatly improved.

Certain nylon resins soluble in hot alcohol or other hot polar solvents have been developed for use in coatings, elastomeric fuel cell diffusion barriers, etc. In general they are polyamide resins in which the regularity of the polymeric chains have been broken up by the co-polymerization of several polyamide forming components, or by random chemical modification of portions of the polymer chains of an initially insoluble nylon resin of regular structure. Such solutions must be kept hot during use, or at any rate must be used very promptly after cooling, as the solutions rather quickly precipitate the resin as a crystalline network which entraps the liquid phase to form a stiff paste.

The reaction of ethylene oxide with nylon resins to yield products which are postulated as having the nitrogen atoms substituted with hydroxyethyl groups and by polyethylene oxide chains terminating in hydroxyethyl groups, has been described by Haas et al. J. Polymer Science 15, 427–446 (1955). Some of the nylon resins so treated were of the hot-alcohol-soluble type referred to above. However, no specific improvements of the properties were noted by the investigators. Particularly, the investigators did not note, and repetition of their experiments has not shown, any improvement in the solution behavior of the hot-alcohol-soluble nylons.

Accordingly it is an object of this invention to provide hot-alcohol-soluble nylon resins, the solutions of which will remain stable and useable for extended periods after cooling to ordinary room temperatures.

Another object is to provide such resins, the solutions of which will be uniformly smooth and free from gel particles.

Another object is to obtain nylon resins of the above properties by reacting a conventional hot-alcohol-soluble nylon resin with ethylene oxide under specially controlled conditions set out more fully hereinafter.

The invention will be described in connection with the attached drawing, which is a graph showing the interrelated effects of supplying various amounts of reactants to the process of this invention.

SYNOPSIS OF THE INVENTION

The above and other objects are secured, in accordance with this invention, in a process in which a controlled amount of water is added to a hot-alcohol-soluble nylon resin, which resin is thereafter contacted with ethylene oxide. The amount of water added is coordinated with the amount of ethylene oxide supplied in accordance with the graph in the drawing, in which, for each 100 grams of nylon, the abscissa of any point represents the amount of water supplied, and the ordinate represents the amount of ethylene oxide supplied. In the carrying out of this invention, the point representing the amounts of water and ethylene oxide consumed should be within the quadrilateral ABCD on the graph. Under these conditions, the ethylene oxide reacts with the nylon to yield products which form gel-free solutions in hot ethanol and other polar solvents, which solutions, after cooling, remain stable for extended periods of time at ordinary room temperatures.

THE ALCOHOL-SOLUBLE NYLON RESINS

Referring now to the nylon resins used as the starting materials in the practice of this invention, these are a particular type within the broad class of nylon resins. The nylon resins are a well-known type of linear high polymers having —CO—NH— linkages interspersed along the chain, produced by the condensation of di-amines with dicarboxylic acids, by the condensation of aminocarboxylic acids with themselves, by the simple polymerization of cyclic carboxylic amides, or by the interpolymerization of any of these classes of compounds. The hot-alcohol-soluble nylon resins constitute a subclass within the broad class of nylon resins, wherein the even structure of the polyamide chains is broken up at intervals so as to impair the crystallinity of the polymers and render the polymers soluble in hot alcohol and other polar organic solvents. For instance, a plurality of disparate amide-forming materials may be interpolymerized; an interpolymer of hexamethylene adipamide, hexamethylene sebacamide and caprolactam in the ratios of 60/20/20 by weight is an example of such an interpolymer. Other such interpolymers are for instance those of 11-amino-undecanoic amide, hexamethylene adipamide and caprolactam; of 9-aminononanoic amide, hexamethylene adipamide and hexamethylene sebacamide; and the like. Instead of simple unaltered polyamide nylons, there may be employed nylons in which a portion of the amide nitrogens carry methoxymethyl groups rather than simple hydrogen atoms; such structures impart irregularity to the chains and thereby promote alcohol solubility. In general, the hot-alcohol-soluble nylons employed as starting materials in this invention will be those nylons which have a sufficiently irregular structure that they are soluble to the extent of 10% or more in ethanol at its atmospheric boiling point.

THE CORRELATION OF WATER AND ETHYLENE OXIDE ADDITION IN THE PRACTICE OF THIS INVENTION

In the discussion to follow, the term "ethylene oxide consumed" refers to ethylene oxide which actually undergoes some sort of reaction in the process of this invention; for instance, if the reaction is terminated before all of the ethylene oxide charged has reacted, either by combining with the nylon or by forming by-products, only that portion of the ethylene oxide which has reacted in one of these ways is included under the term "ethylene oxide consumed." Of course, in those cases where the reaction is continued until all of the ethylene oxide has reacted, the amount of ethylene oxide consumed will be identical with that originally charged. All percentages of water added, ethylene oxide supplied and ethylene oxide combined with the nylon are on the basis of the original dry nylon.

In the practice of this invention, the amount of ethylene oxide which combines chemically with the nylon is a function both of the water added to the nylon and also of the ethylene oxide consumed. The interrelation is shown in the graph of the drawing, in which each point represents the amounts of the reactants consumed, the abscissa of the point representing the amount of water added, and the ordinate representing the ethylene oxide consumed, in any particular reaction according to this invention. The curves having the percentage numbers "15%," "20%," "25%" and "30%" juxtaposed thereto are contours of points representing processes in which equal amounts (15%, 20%, 25%, 30% as indicated by the percentages juxtaposed to the respective curves) of ethylene oxide combine chemically with the nylon resin. The data upon which the graph is based were obtained from reactions conducted at 70° C.; however, within the customary ranges of temperature, no great departure from these results will occur. For most purposes it will be desired to introduce at least about 15% of ethylene oxide into the nylon; accordingly, combinations of amounts of water added and of ethylene oxide consumed will be selected from points in the vicinity of the 15% contour, or above it. The straight line AD is a fair approximation to this contour. It has been found that if operations are carried out in the region to the left of the straight line AB, solutions of the product will contain regions of gel, which show up as soft lumps which prevent the deposition of smooth coatings from the solution; accordingly operations should be conducted in regions to the right of this line. It will be seen that the requirement of ethylene oxide consumed for any given amount to be combined with the nylon mounts up rapidly with increase in the amount of water added, note the steep slope of the contour lines; accordingly, it is desirable to keep the addition of water to a minimum, while allowing a safe margin from the gel line AB. To this end, it is recommended that operations be conducted with the addition of less than 3.75 grams of added water per 100 grams of nylon, i.e., operations should be conducted to the left of the line CD. Ordinarily, it will be uneconomic to consume more than 140 grams of ethylene oxide per 100 grams of nylon, i.e. operations should be conducted below the line BC. Based on all of these considerations, the water and ethylene oxide should be consumed in amounts represented by points within the quadrilateral ABCD, the coordinates of the vertices of which are as follows:

Table I

| Vertex | Grams of Water Supplied Per 100 Grams of Nylon | Grams of Ethylene Oxide Consumed Per 100 Grams of Nylon |
|---|---|---|
| A | 1.25 | 61 |
| B | 2.0 | 140 |
| C | 3.75 | 140 |
| D | 3.75 | 116 |

THE CARRYING OUT OF THE PROCESS

In carrying out the process of this invention, the amount of water selected for the operation is added to the nylon starting material and kept in contact therewith until it has diffused evenly throughout all portions of the resin. In order to facilitate the diffusion, the nylon should preferably be subdivided into relatively small granules, all parts of which are not more than one-quarter inch, and preferably not more than one-eighth inch, from a surface of the granule. Conveniently, this step of the process is carried out by simply agitating the nylon granules with the water to insure a gross distribution of the water to all portions of the granules and thereafter storing the nylon in a sealed container so as to permit neither loss nor access of water. It is not sufficient, in the practice of this invention, that water be merely added to the reaction mass during the ethylene oxide treatment; the water must be thoroughly and evenly absorbed throughout all portions of every granule of the resin. Generally, a period of two weeks' storage at 25° C. will suffice to bring about the desired equilibrium and absorption of the water.

The nylon, which has absorbed the water evenly, is next contacted with ethylene oxide at temperatures on the order of 60°–100° C. under pressures sufficient to contain the reactants, and agitated therewith to bring about full contact of the nylon and ethylene oxide with each other. The ethylene oxide may conveniently be present in liquid form, or may be supplied as the vapor as it is consumed during the process. The total amount of ethylene oxide selected to be reacted during the run may all be added to the reaction vessel at the outset, or may be supplied at intervals over the course of the reaction. When the pre-selected amount of ethylene oxide has reacted (as indicated by a drop in the partial pressure of ethylene oxide to substantially zero if the exact amount of ethylene oxide was charged as was intended to be reacted; or, if more ethylene oxide was charged than was intended to be reacted, as indicated by an analysis of the reactor contents), the reactor is vented and the contents discharged. The granular nylon will be found to be coated with oily by-product polymers of ethylene oxide, and the granules will themselves be somewhat swollen by polymers of ethylene oxide absorbed therein. These by-products are water soluble or water dispersible, and may be removed by extraction with water.

THE PRODUCTS

The ethylene-oxide treated products of this invention are soluble in hot polar organic solvents, such as methanol, ethanol, ethanol-water mixtures, and the like. In contrast to the ethylene-oxide-treated products of the prior art, solutions prepared from the products at relatively high concentration, i.e., in the range of 10–40%, may be cooled to room temperature and will remain as homogeneous solutions for extended periods of time, i.e., for several days. This greatly facilitates the use of the materials for coating, impregnating etc., under industrial conditions; in contrast to the situation with solutions of hydroxyethylated nylons heretofore prepared, it is not necessary to use the solutions promptly after preparation, or alternatively to keep the solutions in heated pots. Furthermore, the solutions or homogeneous throughout, and do not contain gel particles as do the solutions of such products heretofore prepared. It will be appreciated that such gel particles greatly interfere with the deposition of smooth films and coatings from the solutions, and the homogeneous character of the products prepared in accordance with the present invention is of great advantage. The products are of especial use in the deposition of diffusion barriers in non-metallic cells and bladders used as fuel and lubricant tanks in aircraft and other vehicles, and also as collapsible liquid transport cells. Such barriers are usually formed by painting a film of the barrier material on one ply of the cell during the manufacture thereof, and the improved solution behavior of the instant products are highly advantageous in this application. Likewise the products may be used for impregnating fabrics, felts, paperboard, leather and other porous and/or fibrous materials; for sizing, surface finishing and other purposes; as thickeners in aqueous dispersions; and in other analogous applications.

With the foregoing general discussion in mind, there are given herewith detailed specific examples of the carrying out of this invention. All parts and percentages are given by weight.

EXAMPLE I

A nylon which was an interpolymer of hexamethylene adipamide, hexamethylene sebacamide and caprolactam in the ratios of 60/20/20 by weight was used in the runs described below. The nylon was in the form of ⅛″ cubes as received from the manufacturer and was substantially free of any water content. Separate lots of the nylon were hermetically sealed into corrosion-proof containers, together with various percentages of added water ranging from 1.4% to 2.2%, based on the weight of the nylon resin. The several containers were stored at an even temperature of 25° C. for 17 days in order to insure that the water would be evenly distributed and at equilibrium throughout all parts of the nylon granules.

A series of hydroxyethylation runs was made, using nylons resins containing various proportions of added water, supplying various amounts of ethylene oxide in the several runs. In each run 100 grams of the nylon of the water content selected for the run were charged into a 28-ounce beverage bottle, and cooled to 0° C. The amount of liquid ethylene oxide selected for the run was charged into the bottle at 0° C., and the bottle sealed with a cork-backed aluminum foil-lined crown cap, and attached to a wheel which revolved and dipped the bottle into a water bath at 70° C. At the end of 28 hours on the wheel, the bottle was removed and opened. At the end of all of the runs, the bottles were free of pressure, indicating that the ethylene oxide had reacted completely, either to combine with the nylon or to form ethylene oxide polymers. The charge was removed from the bottle and found to consist of the original nylon particles, containing more or less ethylene oxide reacted therewith and somewhat swollen with ethylene oxide polymer dissolved therein; and an oily coating of ethylene oxide polymer on the exterior of the polymers. The ethylene oxide polymer, both dissolved in the resin and coating the surface thereof, was removed by thoroughly washing in water at 25° C., followed by soaking at 70° C. in twice the volume of the resin of water for 18 hours. The product was separated from the soaking water, again thoroughly washed with water at 25° C., and then dewatered, dried at 50° C. for 48 hours, and weighed. The increase in weight was taken as the amount of ethylene oxide which had chemically combined with the nylon. The solution properties of the product were evaluated by dissolving a 10-gram sample in 100 ml. of a mixture of 95 volumes of 2B ethanol and 5 volumes of water at a temperature of 70° C. The solution was swirled against the side of a glass vessel containing same; any gel particles in the solution showed up as small, unevenly-draining blobs of the solution on the glass wall. Set forth herewith in Table II are the percentages of added water in the nylon, and the weights of ethylene oxide used, in the several runs, together with the amounts of ethylene oxide chemically combined in the respective products and the operator's ratings thereof with respect to the presence or absence of gel particles.

*Table II*

| Added Water (percent, based on the weight of original nylon) | Ethylene Oxide Charged (percent based on the weight of original nylon) | Combined Ethylene Oxide (percent based on the weight of original nylon) | Examination for Gel | Run No. |
|---|---|---|---|---|
| 1.4 | 80 | 19.9 | very slight gel | 1 |
|  | 90 | 23.3 | do | 2 |
|  | 100 | 27.3 | slight gel | 3 |
| 1.6 | 80 | 17.3 | gel free | 4 |
|  | 90 | 21.9 | do | 5 |
|  | 100 | 25.3 | very slight gel | 6 |
| 1.8 | 90 | 20.2 | gel free | 7 |
|  | 100 | 22.1 | do | 8 |
|  | 110 | 25.2 | do | 9 |
| 2.0 | 90 | 17.2 | do | 10 |
|  | 100 | 20.6 | do | 11 |
|  | 110 | 24.8 | do | 12 |
| 2.2 | 100 | 20.2 | do | 13 |
|  | 110 | 22.1 | do | 14 |
|  | 120 | 25.9 | do | 15 |

EXAMPLE II

|  | Lbs. |
|---|---|
| Nylon resin (terpolymer of hexamethylene adipamide, hexamethylene sebacamide and caprolactam in the weight ratio of 60/20/20: equilibrated to contain 1.8% of water) | 10 |
| Ethylene oxide | 11 |

The nylon resin used in this preparation had presumably been equilibrated with 1.8% of water, based on the weight of nylon, by storing the nylon for 45 days in contact with the required amount of water in a sealed drum. The nylon was in the form of commercial chips ⅛" in thickness. The apparatus employed was a stainless steel, 5-gallon autoclave provided with a heating and cooling jacket, and an anchor stirrer having close clearance with the bottom of the autoclave and having upward extensions having close clearance with the side walls of the autoclave. The autoclave was cooled to 0° C., the ingredients of the recipe charged, and the autoclave sealed. Agitation was commenced, and the jacket temperature raised to 75° C., the charge temperature rising to a steady value of 69° C. and the pressure rising to about 80 p.s.i.g. within two hours. These conditions continued until 27 hours after the beginning of the run, at which time the pressure dropped to 55 p.s.i.g. and the batch rose to 75° C., presumably due to reduced cooling by reflux from the uninsulated head of the autoclave. The jacket temperature was reduced to 71° C., and the reaction continued for an additional 6½ hours, during which time the charge temperature levelled off to about 68° C. and the pressure dropped to atmospheric. The batch was then cooled to 25° C. and discharged. The reaction mass consisted of chips of the form originally charged, coated with an oily layer of ethylene oxide polymers. The mass was washed once with water at 40° C., and thereafter several times with water at 80° C. The mass was then allowed to stand in contact with water at initially 70° C., but cooling down to 25° C., over a period of 18 hours, dewatered, and dried in an oven at 50° C. There were obtained 13 pounds of product, indicating 23.1% of combined ethylene oxide. Ten grams of the product were readily dissolved in 100 ml. of a mixture of 95 volumes of 2B ethanol and 5 volumes of water, the resultant solution being free of gel particles and being stable for a number of weeks after cooled to room temperature. The product was used in the production application of diffusion barriers to aircraft fuel cells, and gave excellent satisfaction, since its solutions were stable and readily handled under factory conditions, and were free from gel particles and other discontinuities.

From the foregoing general discussion and detailed specific examples, it will be evident that this invention provides a novel and improved process for the preparation of ethylene oxide treated nylons having improved solubility characteristics, particularly in respect to stability of the solutions at room temperatures, and freedom from gel particles.

What is claimed is:

1. Process which comprises adding water to an alcohol-soluble polycarbonamide resin which is an interpolymer selected from the group consisting of interpolymers of hexamethylene adipamide, hexamethylene sebacamide and caprolactam, interpolymers of 11-aminoundecanoic amide, hexamethylene adipamide and caprolactam, and interpolymers of 9-aminononanoic amide, hexamethylene adipamide and hexamethylene sebacamide, storing the resin and water together until the water has diffused and has become evenly absorbed throughout all portions of the resin, and thereafter contacting the resin with monomeric ethylene oxide until a predetermined amount of monomeric ethylene oxide has been consumed, the amount of ethylene oxide consumed being calculated as the sum of that reacting with the resin and that forming ethylene oxide polymers, the amount of water added and the predetermined amount of monomeric ethylene oxide being so correlated that, on a Cartesian plot, the point whose X coordinate equals the grams of water added per 100 grams of resin and whose Y coordinate equals the grams of monomeric ethylene oxide consumed per 100 grams of resin, lies within the quadrangle ABCD, the vertices of which have the coordinates

| Vertex | X Coordinate, Water Added | Y Coordinate, Monomeric Ethylene Oxide Consumed |
|---|---|---|
| A | 1.25 | 61 |
| B | 2.00 | 140 |
| C | 3.75 | 140 |
| D | 3.75 | 116 |

2. Process which comprises adding water to an alcohol-soluble polycarbonamide resin which is an interpolymer selected from the group consisting of interpolymers of hexamethylene adipamide, hexamethylene sebacamide and caprolactam, interpolymers of 11-aminoundecanoic amide, hexamethylene adipamide and caprolactam, and interpolymers of 9-aminononanoic amide, hexamethylene adipamide and hexamethylene sebacamide, storing the resin and water together until the water has diffused and has become evenly absorbed throughout all portions of the resin, and thereafter contacting, at about 70° C., the resin with monomeric ethylene oxide until a predetermined amount of monomeric ethylene oxide has been consumed, the amount of ethylene oxide consumed being calculated as the sum of that reacting with the resin and that forming ethylene oxide polymers, the amount of water added and the predetermined amount of monomeric ethylene oxide being so correlated that, on a Cartesian plot, the point whose X coordinate equals the grams of water added per 100 grams of resin and whose Y coordinate equals the grams of monomeric ethylene oxide consumed per 100 grams of resin, lies within the quadrangle ABCD, the vertices of which have the coordinates

| Vertex | X Coordinate, Water Added | Y Coordinate, Monomeric Ethylene Oxide Consumed |
|---|---|---|
| A | 1.25 | 61 |
| V | 2.00 | 140 |
| C | 3.75 | 140 |
| D | 3.75 | 116 |

3. Process which comprises adding water to an alcohol-soluble polycarbonamide resin which is a terpolymer of hexamethylene adipamide, hexamethylene sebacamide and caprolactam in the weight ratio of 60/20/20, storing the resin and water together until the water has diffused and has become evenly absorbed throughout all portions of the resin, and thereafter contacting the resin with monomeric ethylene oxide until a predetermined amount of monomeric ethylene oxide has been consumed, the amount of ethylene oxide consumed being calculated as the sum of that reacting with the resin and that forming ethylene oxide polymers, the amount of water added and the predetermined amount of monomeric ethylene oxide being so correlated that, on a Cartesian plot, the point whose X coordinate equals the grams of water added per 100 grams of resin and whose Y coordinate equals the grams of monomeric ethylene oxide consumed per 100 grams of resin, lies within the quadrangle ABCD, the vertices of which have the coordinates

| Vertex | X Coordinate, Water Added | Y Coordinate, Monomeric Ethylene Oxide Consumed |
|---|---|---|
| A | 1.25 | 61 |
| B | 2.00 | 140 |
| C | 3.75 | 140 |
| D | 3.75 | 116 |

4. Process which comprises adding water to an alcohol-soluble polycarbonamide resin which is a terpolymer of hexamethylene adipamide, hexamethylene sebacamide and caprolactam in the weight ratio of 60/20/20, storing the resin and water together until the water has diffused and has become evenly absorbed throughout all portions of the resin, and thereafter contacting, at about 70° C., the resin with monomeric ethylene oxide until a predetermined amount of monomeric ethylene oxide has been consumed, the amount of ethylene oxide consumed being calculated as the sum of that reacting with the resin and that forming ethylene oxide polymers, the amount of water added and the predetermined amount of monomeric ethylene oxide being so correlated that, on a Cartesian plot, the point whose X coordinate equals the grams of water added per 100 grams of resin and whose Y coordinate equals the grams of monomeric ethylene oxide consumed per 100 grams of resin, lies within the quadrangle ABCD, the vertices of which have the coordinates

| Vertex | X Coordinate, Water Added | Y Coordinate, Monomeric Ethylene Oxide Consumed |
|---|---|---|
| A | 1.25 | 61 |
| B | 2.00 | 140 |
| C | 3.75 | 140 |
| D | 3.75 | 116 |

5. Process which comprises adding 1.8 grams of water to 100 grams of an alcohol-soluble polycarbonamide resin, which is an interpolymer selected from the group consisting of interpolymers of hexamethylene adipamide, hexamethylene sebacamide and caprolactam, interpolymers of 11-aminoundecanoic amide, hexamethylene adipamide and caprolactam, and interpolymers of 9-aminononanoic amide, hexamethylene adipamide and hexamethylene sebacamide, storing the resin and water together until the water has diffused and has become evenly absorbed throughout all portions of the resin, and thereafter contacting the resin with monomeric ethylene oxide until the 110 grams of the monomeric ethylene oxide have been consumed, the amount of ethylene oxide consumed being calculated as the sum of that reacting with the resin and that forming ethylene oxide polymers.

6. Process which comprises adding 1.8 grams of water to 100 grams of an alcohol-soluble polycarbonamide resin which is a terpolymer of hexamethylene adipamide, hexamethylene sebacamide and caprolactam in the weight ratio of 60/20/20, storing the resin and water together until the water has diffused and has become evenly absorbed throughout all portions of the resin, and thereafter contacting the resin with monomeric ethylene oxide until 110 grams of the monomeric ethylene oxide have been consumed, the amount of ethylene oxide consumed being calculated as the sum of that reacting with the resin and that forming ethylene oxide polymers.

7. A hydroxyethylated nylon produced by the process of claim 1, the solutions of which are characterized by freedom from gel particles, and by stability against precipitation at room temperatures.

8. A hydroxyethylated nylon produced by the process of claim 3, the solutions of which are characterized by freedom from gel particles, and by stability against precipitation at room temperatures.

9. A hydroxyethylated nylon produced by the process of claim 5, the solutions of which are characterized by freedom from gel particles, and by stability against precipitation at room temperatures.

References Cited in the file of this patent

UNITED STATES PATENTS 2,652,388    De Groote    Sept. 15, 1953
2,835,653    Haas et al.    May 20, 1958

OTHER REFERENCES

Hopff et al.: APC application, Serial No. 393,282, published April 20, 1943.

Du Pont Information Bulletin, "Soluble Nylon Resins," A-2882.